June 7, 1949. R. E. POWELL 2,472,173
WELDING ELECTRODE
Filed June 18, 1947
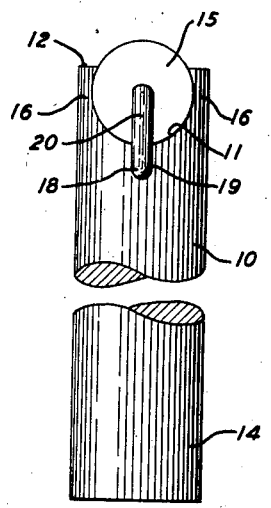
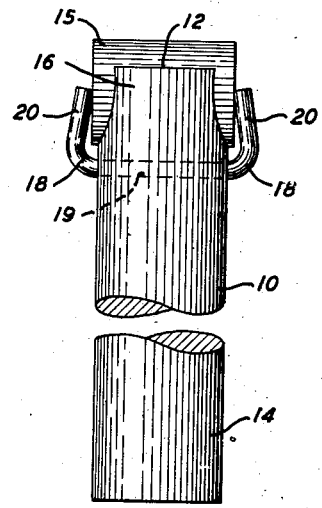
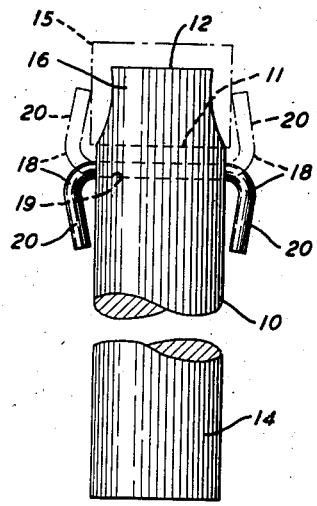
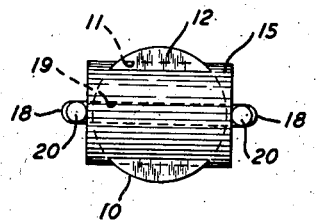
INVENTOR
R. E. POWELL
BY
ATTORNEY Patented June 7, 1949

2,472,173

UNITED STATES PATENT OFFICE 2,472,173

WELDING ELECTRODE

Raymond E. Powell, Westfield, N. J., assignor to Western Electric Company, Incorporated, New York, N. Y., a corporation of New York Application June 18, 1947, Serial No. 755,392

7 Claims. (Cl. 219—4)

This invention relates to welding, and more particularly to electrodes for welding machines.

The efficient operation of a welding machine usually requires the use of electrodes composed of expensive alloy material. The length of the useful life and the cost of replacing such electrodes therefore is an important factor in the operating cost of the machine. When conventional electrodes become worn or otherwise defective, they must be replaced entirely or reconditioned as by grinding, but in either case, the expense for material or labor is considerable.

The principal object of this invention is to reduce operating expense by providing an electrode which has a long useful life and which may be readily reconditioned for further use.

With this and other objects in view, the invention comprises an electrode for spot welding including a body of conductive material having a groove in one end thereof extending at an angle relative to the centerline of the body, a tip member of conductive material rotatably disposed in the groove and having a work contacting area extending out of the groove beyond the adjacent end of the body, and means to removably secure the tip member in the groove. In the normal use of the electrode, the inserted tip tends to rotate or may be rotated about its own axis to present different portions of its area to the work thereby distributing the wear and giving longer life than a fixed tip.

More specifically, the electrode includes a body circular in cross-section and formed of a suitable conductive material with a groove substantially circular in cross-section positioned in one end of the body with its centerline short of the end thereof yet forming an opening in the end of the body. The removable tip may be cut from a rod formed of suitable conductive material, the tip being circular in cross-section and receivable in the groove. The sides of the body at the groove extend partially around the tip to hold it in place laterally. An aperture is formed in the body short of the groove and in this aperture suitable holding means in the form of a U-shaped element is disposed with its ends bent to engage the ends of the tip to hold the tip against displacement longitudinally.

Other objects and advantages will be apparent from the following detailed description when considered in conjunction with the accompanying drawing, wherein Fig. 1 is a side elevational view of the electrode;

Fig. 2 is a front elevational view of the electrode;

Fig. 3 is a front elevational view of the electrode with the tip removed, and

Fig. 4 is an end elevational view of the electrode.

Referring now to the drawing, the electrode comprises a body 10 circular in cross-section formed of a suitable conductive material such as copper and provided with a groove 11 adjacent the outer end 12, the inner end 14 being conditioned for connection with an electrode holder of a spot welding machine (not shown). The groove 11 is substantially circular in cross-section, its centerline extending at right angles to the centerline of the body 10 and positioned short of the end 12. This formation of the groove causes a tip 15, circular in cross-section, when disposed in the groove to extend partially beyond the end 12 to engage work to be welded. Furthermore, the formation of the legs 16 of the body at each side of the groove extend partially around the tip 15 to hold it against displacement in any direction other than the direction of its axis.

The tip 15 is formed of any suitable conductive material most desirable to withstand the wear to which it is subjected during welding operations. The tip may be cut from a rod of tungsten, molybdenum or any other suitable material, depending upon the materials of the articles they are to weld together. By forming the tips 15 initially in the form of a rod, the expense of manufacturing the tips is reduced to a minimum. Furthermore, the tips may be cut from the rod in any desired manner, such as by the aid of a hacksaw, slight variations in their overall length not being of great importance.

The holding means other than the sides of the sides 16 of the body includes a U-shaped element 18 in the form of a wire extending through an aperture 19 in the body 10 short of the groove 11. The legs 20 of the element 18 may be bent inwardly toward each other so that when moved to cause their ends to engage with the ends of the tip 15 at their centers, the resiliency of the legs will maintain their connections with the tip and hold the tip against displacement longitudinally.

It will be apparent that when the electrode is in use, the outermost portion of the tip will engage the work. The tip being circular in cross-section therefore provides a multiplicity of contacting areas which may be positioned to engage the work by periodically rocking the tip in the groove 11 to position new surfaces of the tip at the work engaging position as the former surfaces become worn or otherwise damaged during operation on work. The legs 20 of the holding element 18, having their ends contacting the sides of the tip 15 at the centerline of the tip, will function in holding the tip against displacement, and jointly act as a pivot for the axis of the tip whereby the tip may rotate freely within the groove, either automatically during welding operations or by manual rocking the tip when the machine is idle.

This type of rotatable tip in the electrode will serve many times the life of the conventional tip due to the numerous work engaging areas and after they have all been used, the tip may be readily removed by rocking the element 18 about its central portion in the aperture 19, freeing the present tip for removal from the groove 11 and the positioning of another tip in the groove. The second tip may be readily secured in place by rocking the element 18 until the ends of the legs 20 are positioned in the axis of the new tip.

Although specific improvements of the invention have been shown and described, it will be understood that they are but illustrative and that various modifications may be made therein without departing from the scope and spirit of this invention as defined by the appended claims.

What is claimed is:

1. An electrode for welding comprising a body of conductive material having a groove substantially circular in cross-section extending at an angle relative to the centerline of the body through one end of the body, and a tip member circular in cross-section disposed in the groove and extending through the groove beyond the adjacent end of the body.

2. An electrode for welding comprising a tip member circular in cross-section formed of conductive material, and a body formed of conductive material and having a groove substantially circular in cross-section extending through one end of the body to receive and hold the tip member for rotation therein to selectively position portions of the periphery of the tip member through the groove and beyond the adjacent end of the body.

3. An electrode for welding comprising a tip member circular in cross-section formed of conductive material, a body formed of conductive material and having a groove substantially circular in cross-section extending through one end of the body to receive and hold the tip member for rotation therein to selectively position portions of the periphery of the tip member through the groove and beyond the adjacent end of the body, and means carried by the body to hold the tip member against displacement.

4. An electrode for welding comprising a body of conductive material having a groove substantially circular in cross-section extending at an angle relative to the centerline of the body through one end of the body, a tip member circular in cross-section disposed in the groove and extending through the groove beyond the adjacent end of the body, and a flexible element carried by the body to be bent into engagement with the ends of the tip member to hold it against displacement.

5. An electrode for welding comprising a body of conductive material having a groove substantially circular in cross-section extending at an angle relative to the centerline of the body through one end of the body, and a tip member, cut from a circular rod of conductive material, disposed in the groove and extending through the groove beyond the adjacent end of the body.

6. An electrode for welding comprising a tip member cylindrical in general contour formed of conductive material, and a body of conductive material having an aperture, similar in contour to the cylindrical tip member with its centerline traversing the body and positioned short of one end of the body a distance less than the radius of the aperture to extend through the said end of the body, whereby the tip member may be mounted therein for rotary adjustment about the centerline to position selected portions of the periphery of the tip member beyond the said end portion.

7. An electrode for welding comprising a tip member cylindrical in general contour formed of conductive material, a body of conductive material having an aperture, similar in contour to the cylindrical tip member with its centerline traversing the body and positioned short of one end of the body a distance less than the radius of the aperture to extend through the said end of the body, whereby the tip member may be mounted therein for rotary adjustment about the centerline to position selected portions of the periphery of the tip member beyond the said end portion, the body also having a second aperture therein parallel with the first mentioned aperture, and a substantially U-shaped retaining element mounted with its central portion rotatably disposed in the second aperture and its leg portions movable simultaneously into and out of engagement with their respective ends of the tip member to hold the tip member in its aperture or free the tip member for its removal from the aperture.

RAYMOND E. POWELL.

REFERENCES CITED

The following references are of record in the file of this patent:

UNITED STATES PATENTS

| Number | Name | Date |
| --- | --- | --- |
| 1,772,444 | Giacchino | Aug. 5, 1930 |
| 1,992,990 | Burns | Mar. 5, 1935 |
| 2,346,088 | Shobert | Apr. 4, 1944 |